United States Patent [19]

Ozaki

[11] Patent Number: 6,089,887

[45] Date of Patent: *Jul. 18, 2000

[54] SOCKET FOR DISCHARGE LAMP BULB

[75] Inventor: Akiyoshi Ozaki, Shizuoka, Japan

[73] Assignee: Koito Manufacturing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,390

[22] Filed: May 2, 1997

[30] Foreign Application Priority Data

May 10, 1996 [JP] Japan .................................. 8-140837

[51] Int. Cl.[7] ............................. H01R 13/44; H01R 33/96
[52] U.S. Cl. ...................... 439/139; 200/51.09; 439/140; 439/180
[58] Field of Search ................................ 439/131, 139, 439/140, 310, 259, 188, 180, 187; 200/506, 51.08, 51.09

[56] References Cited

U.S. PATENT DOCUMENTS

| | | | |
|---|---|---|---|
| 776,855 | 12/1904 | La Har | 439/138 |
| 1,171,914 | 2/1916 | Wright | 439/140 |
| 1,727,826 | 9/1929 | Harris | 439/616 |
| 2,181,050 | 11/1939 | Evans | 439/137 |
| 3,936,122 | 2/1976 | Hagelberg | 439/138 |
| 4,461,523 | 7/1984 | Ustin et al. | 439/139 |
| 4,875,866 | 10/1989 | Winant | 439/140 |
| 5,593,324 | 1/1997 | Ito | 439/918 |
| 5,823,806 | 10/1998 | Nagase et al. | 439/140 |
| 5,871,377 | 2/1999 | Sato et al. | 439/611 |

FOREIGN PATENT DOCUMENTS

| | | | |
|---|---|---|---|
| 2337954 | 8/1977 | France | 439/139 |
| 2553610 | 4/1977 | Germany | 439/140 |
| 56-97979 | 8/1981 | Japan . | |

Primary Examiner—Neil Abrams
Attorney, Agent, or Firm—Sughrue, Mion, Zinn, Macpeak & Seas, PLLC

[57] ABSTRACT

A socket (11) for a discharge lamp bulb includes two power supply terminals, and a shielding wall for completely shielding the two power supply terminal from each other when a discharge lamp bulb is not properly seated in the socket (11). In different embodiments the socket (11) includes (FIGS. 2–5) a spring biased reciprocatably mounted cylindrical wall (24) to separate power supply terminals (21, 23), a (FIGS. 6, 7) center contact (21) mounted for reciprocation between a recessed position and an operating position in response to lamp insertion, a (FIGS. 9–14) rotary sliding member (34) or a rotary ring (40) both of which are spring biased to a blocking position and movable to a non-blocking position by lamp insertion into the socket, and a (FIGS. 16, 17) rotationally mounted member (47) having a plate (50) for separating power supply terminal segments (23b, 23c) prior to complete insertion of the lamp.

7 Claims, 10 Drawing Sheets

SOCKET FOR DISCHARGE LAMP BULB

BACKGROUND OF THE INVENTION

The present invention relates to a socket of a discharge lamp bulb. More particularly, the present invention relates to a technique for avoiding discharging between supply terminals by power supply where the socket is not connected to or incompletely connected to the discharge lamp bulb.

In recent years, a discharge lamp bulb has been used as a light source of a head light for a motor vehicle.

In the case of such a discharge lamp bulb, a socket for the discharge lamp bulb is located between a starting circuit and the discharge lamp bulb.

In the discharge lamp described, a high starting voltage is supplied between power supply terminals for a discharge lamp bulb. Therefore, with the power supply terminal not surely connected to the terminals of the discharge lamp bulb, i.e. a socket for the discharge lamp bulb not fixed to a normal connecting position relative to the discharge lamp bulb, when a starting voltage is supplied, discharge occurs between the supply terminals. This may lead to a problem of damaging the socket for the discharge lamp bulb, the discharge lamp bulb or both thereof.

The present invention intends to avoid discharging between power supply terminals where a socket for the discharge lamp bulb is not fixed to the normal connecting position relative to a discharge lamp bulb.

SUMMARY OF THE INVENTION

In order to solve the problem, the socket for a discharge lamp bulb according to the present invention comprises a means for securing it to a normal position of the discharge lamp bulb and a means for insulating two kinds of power supply terminals from each other when the discharge lamp bulb is secured to an abnormal position.

Therefore, in the socket for a discharge lamp bulb according to the present invention, where it is incompletely connected to the discharge lamp bulb, the two kinds of power supply terminals are insulated from each other. Thus, discharging leading to damaging the discharge lamp bulb or socket therefor does not occur.

DETAILED DESCRIPTION OF THE PREFERRED EMBODIMENTS

An explanation will be given of embodiments of a socket for a discharge lamp bulb according to the present invention.

FIGS. 1 to 5 show a first embodiment of the socket for a discharge lamp bulb according to the present invention. This embodiment is applied to the socket for a discharge lamp bulb used for a head light of a motor vehicle. This applies to other embodiments.

Figure 1:
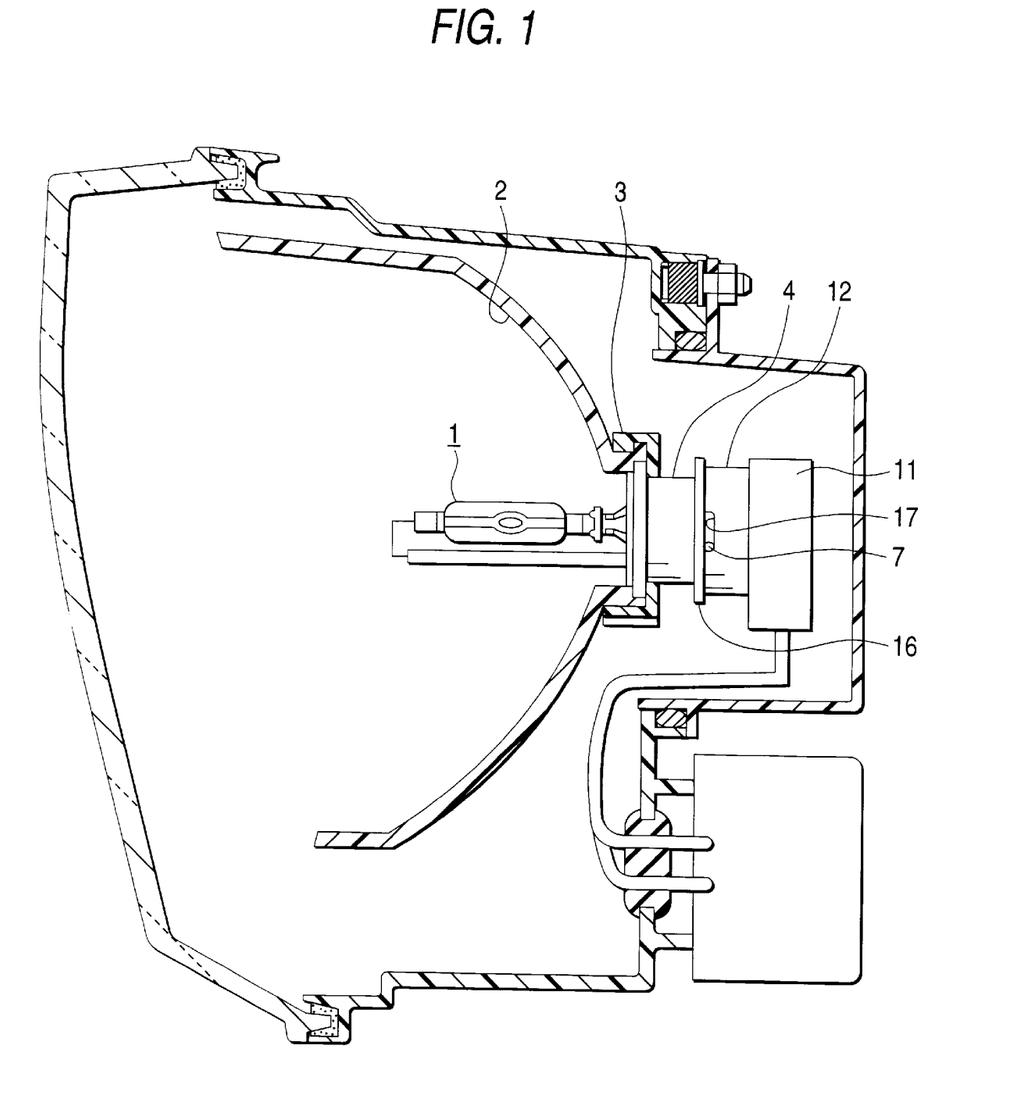
FIG. 1 shows a first embodiment of a socket for a discharge lamp bulb according to the present invention together with FIGS. 2 to 5, and is a longitudinal sectional view of a headlight for a motor vehicle equipped with a socket for a discharge lamp bulb according to the present invention.

A discharge lamp bulb 1 is removably attached to a reflector 2 through a set ring 3.

Figure 3:
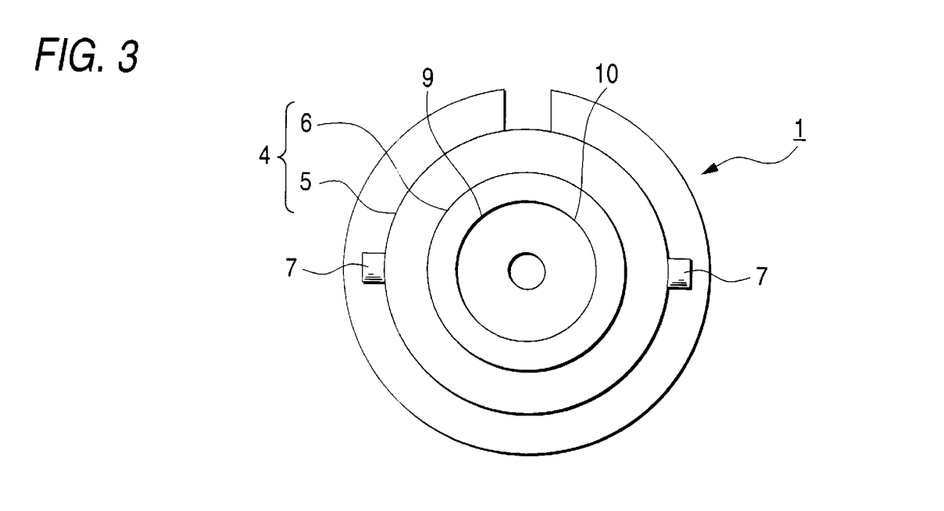
FIG. 3 is an enlarged rear view of the discharge lamp bulb.

A base 4 of the discharge lamp 1 has a shape comprising two cylinders having different sizes, i.e. a front large diameter portion 5 and a rear small diameter portion, stacked in two steps. The base 4 is made of an electrically insulating material, e.g. synthetic resin. At the positions opposite to each other of the rear portion of the outer periphery of the large diameter portion 4, a pair of engagement protrusions 7, 7 protrude integrally. At the front of the outer periphery of the small diameter portion 6, an outer terminal or "Lo (low) side terminal" 8 is formed in a ring-shape on the entire periphery. In this case, in the portion where the low side terminal 8 of the small diameter 6 is located, a shallow groove is formed so that the outer periphery of the low side terminal is flush with the that of the small diameter portion. At the small diameter portion 6, a recess 9 opening toward the rear is formed. From the center of the bottom of the recess 9, a cylindrical inner terminal or "Hi (high) side terminal" 10 protrudes toward the rear. It should be noted that the rear of the high side terminal 10 is located at substantially the same portion as that of the small diameter portion 6.

Figure 2:
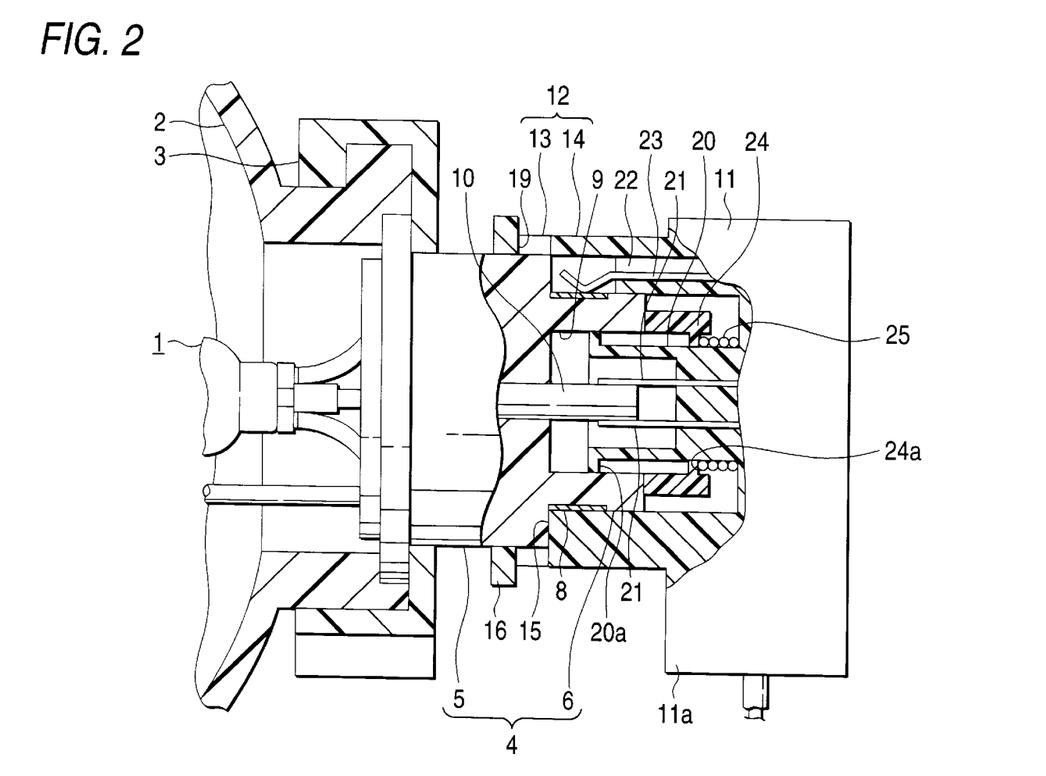
FIG. 2 is an enlarged longitudinal sectional view of the main part of the socket.

A body 11a for a discharge lamp bulb socket 11 is made of an electrically insulating material, e.g. synthetic resin and has a coupling portion 12 having a cylindrical shape. The coupling portion 12 comprises a front securing portion 13 being about one third portion in length and a rear connecting portion 14 being about two third portion in length. The inner diameter of the securing portion 13 is much smaller than that of the connecting portion 12 so that at the boundary between the securing portion 13 and connecting portion 12, a forward-looking step 15 is formed.

Figure 4:
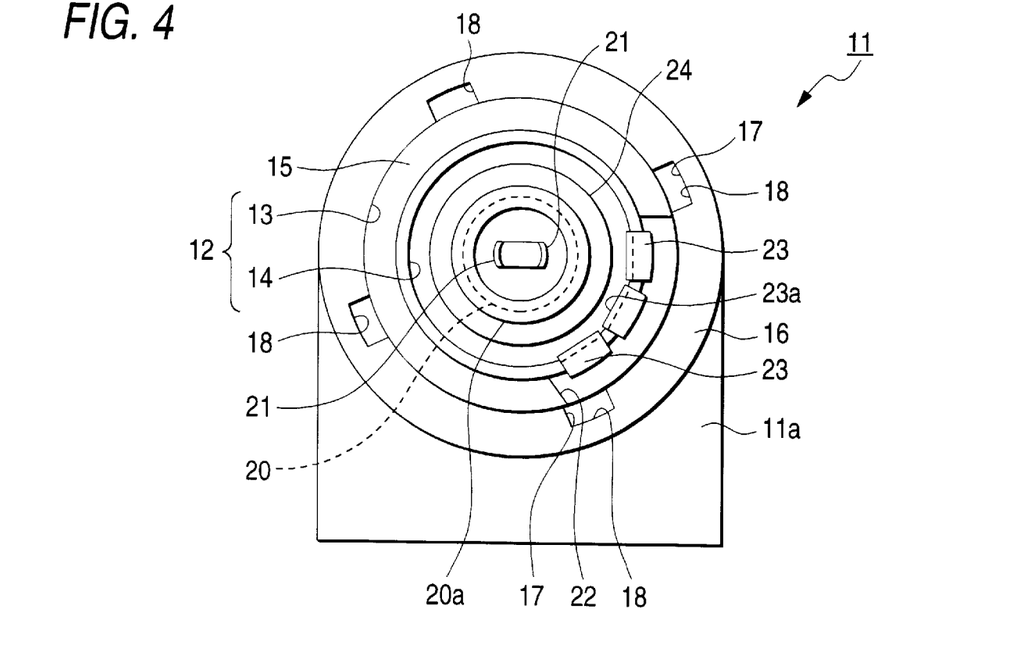
FIG. 4 is an enlarged rear view of the socket for a discharge lamp bulb.

The securing portion 13 has a flange 16 externally extending at the front tip. The securing portion 13 has L-shaped engagement grooves 17, 17, . . . at the front tip. The engagement groove 17 comprises an introducing portion 18 extending in an axial direction and opened in the front tip and an engagement portion 19 and extending in a circumferential direction from the rear end of the introducing portion 18. The read end of the introducing portion 18 and the rear end of the engagement portion 19 are flush with the above step 15. The innermost part of the engagement portion 19, i.e., part located at the position opposite to the introducing portion 18 is referred to as an engagement part 19a whose length and width are made approximately equal to the outer size of the engagement 7 of the discharge lamp bulb 1. The part 19b other than the engagement part 19a of the engagement portion 19 has a width on the side of the introducing portion 18 which is equal to or slightly larger than the engagement protrusion 7. The part 19b has a width becoming gradually small toward the engagement portion 19a and smaller than the outer size of the engagement protrusion 7 immediately in front of the engagement part 19a to form a hanging part 19c at the boundary between it and the engagement part 19a.

Thus, the coupling and securing between the socket 11 and the discharge lamp bulb 1 will be carried out as follows.

First, the coupling portion 12 of the socket 11 is fit over the base 4 so that the engagement protrusions 7, 7 of the discharge lamp bulb 1 are inserted into the two engagement grooves 17, 17 located oppositely, respectively. When the engagement protrusions 7, 7 reach the rear ends of the introducing section 18, 18, the socket 11 is rotated so that the engagement protrusions 7, 7 are inserted into the engagement portions 19, 19. Thus, the engagement protrusions 7, 7 move on the parts 19b, 19b relatively toward the engagement parts 19a, 19a. Finally, the engagement protrusion 7, 7 come in the engagement parts 19a, 19a over the hanging parts 19c, 19c while spreading out the width of the parts 19b, 19b with the aid of the elasticity of material of the socket 11. Accordingly, the socket 11 is secured to the discharge lamp bulb 1. This position is referred to as a securing position. The discharge lamp bulb 1 and socket 11 remain in the securing position, until a rotation force is applied which is strong enough to cause the engagement protrusions 7, 7 to spread the width of the engagement grooves 17, 17, and move toward the introducing portions 18, 18.

At the center of the recess of the connecting portion 14, a cylindrical portion 20 protrudes from the bottom. From the bottom of the cylindrical portion 20, high side supply terminals 21, 21 protrude. The high side supply terminals 21, 21 are opposite apart from each other and bent to form a concave shape on their opposite sides. The high side terminal 10 will be pushed in between the high side power supply terminals 21 and 21. It should be noted that the front ends of the high side supply terminals terminate at a position slightly rear from the from end of the cylindrical portion 20.

The inner periphery of the connecting portion 14 is recessed in an arc shape to reach the bottom. From the bottom of the recess 22 thus formed, low side power supply terminals 23, 23, 23 protrude. These power supply terminals 23, 23, 23 have contact sections 23a, 23a, 23a which are bent in a lying V-shape and slightly protrude toward the center of the above recess. The front tip of the power supply terminals 23, 23 and 23 are located slightly rear of the above step 15. The tips of the contact section 23a, 23a, 23a protrude slightly toward the center of the above recess from the inner periphery of the connecting portion 14.

A cylindrical wall 24 is made of an electrically insulating material, e.g., synthetic resin. The insulating wall 24 is slidably fit over the cylindrical portion 20. The insulating wall 24 can move freely between an insulating position where its major part protrudes forward from the cylindrical portion 20 and an opening position where its front end is flush with that of the cylindrical portion 20.

A coil spring 25 is located between the bottom of the connecting portion 14 and insulating wall 24 in a state where it is fit over the cylindrical portion 20. This gives moving force to the insulating wall 24 to be urged to the above insulating position.

A flange 20a which protrudes externally at the front end of the cylindrical portion 20 serves as a stopper for preventing removal of the insulating wall 24 from the cylindrical portion 20. A stopper piece 24a protrudes from the inner periphery of the insulating wall 24 in the vicinity of the rear end thereof. The front end of the spring 25 is elastically attached to the rear face of the stopper piece 24a. When the insulating wall 24 protrudes forward from the spring 25, the stopper piece 24a thereof hits on the flange 20a of the cylindrical portion 20 so that the insulating wall 24 cannot further protrude. Thus, removal of the insulating wall 24 from the cylindrical portion 20 is prevented.

Figure 5:
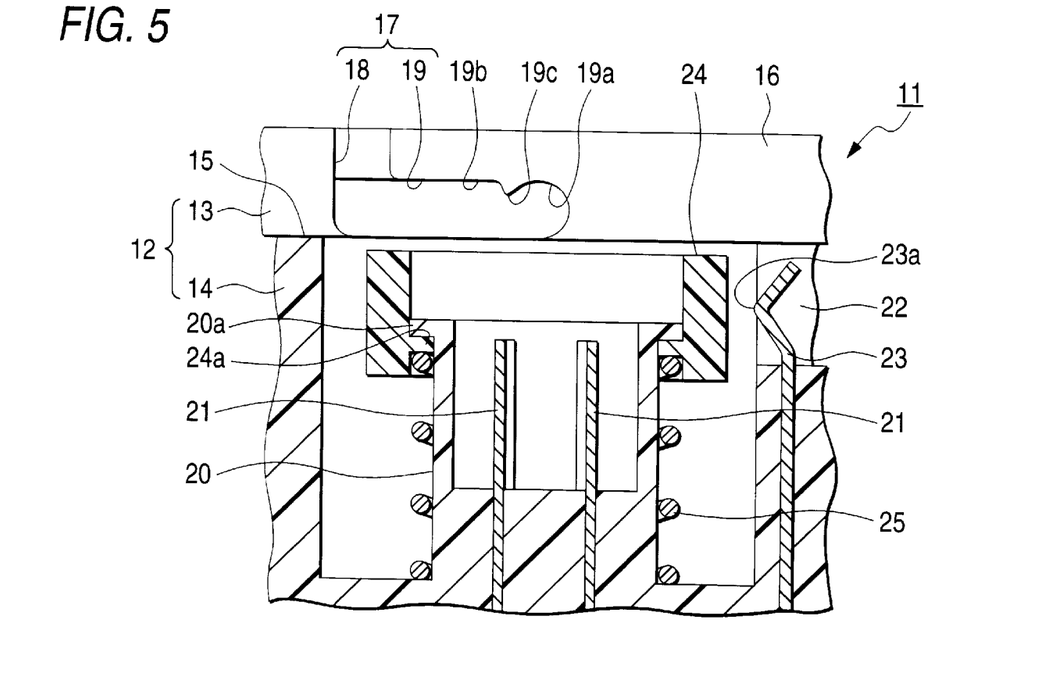
FIG. 5 is a sectional view taken in line V—V of FIG. 4.

Therefore, while the socket 11 is not coupled with the discharge lamp bulb 1, the insulating wall 24 is located at the insulating position shown in FIG. 5 because of the moving force urged by the spring 25. Thus, the space between the high side power supply terminals 21, 21 of the socket 11 and the low side power supply terminals 23, 23, 23 is shielded. For this reason, even when an operating voltage is applied to these two kinds of power supply terminals 21, 21 and 23, 23, 23, discharging will not occur between these kinds of power supply terminals.

Where the socket 11 is attached to the discharge lamp bulb 1 as described above, when the coupling portion 12 of the socket 11 is fit over the base 4 of the discharge lamp bulb 1, the insulating wall 24 is pushed backward by the read end of the small diameter portion 6 of the base 4. Therefore, the insulating spring 24 is moved backward against the moving force of the spring 25 to reach the opening position shown in FIG. 2. Then, the high side power supply terminals 21, 21 of the socket 11 is fit over the high side terminal 10. The contact sections 23a, 23a, 23a of the low side power supply terminals 23, 23, 23 are brought into elastic contact with the low side terminal 8 of the discharge lamp bulb 1. Thereafter, the socket 11 is rotated to be secured to the above securing position.

When the socket 11 does not reach the securing position because of its insufficient rotation, the elastic force of the spring 25 serves to push out the discharge lamp bulb 1 through the insulating wall 24 thereby removing the socket 11 from the discharge lamp bulb 1. As a result, as described above, the insulating wall 24 moves to the insulating position to shield the space between the high side power supply terminals 21, 21 and the low side power supply terminals 23, 23, 23.

Figure 6:
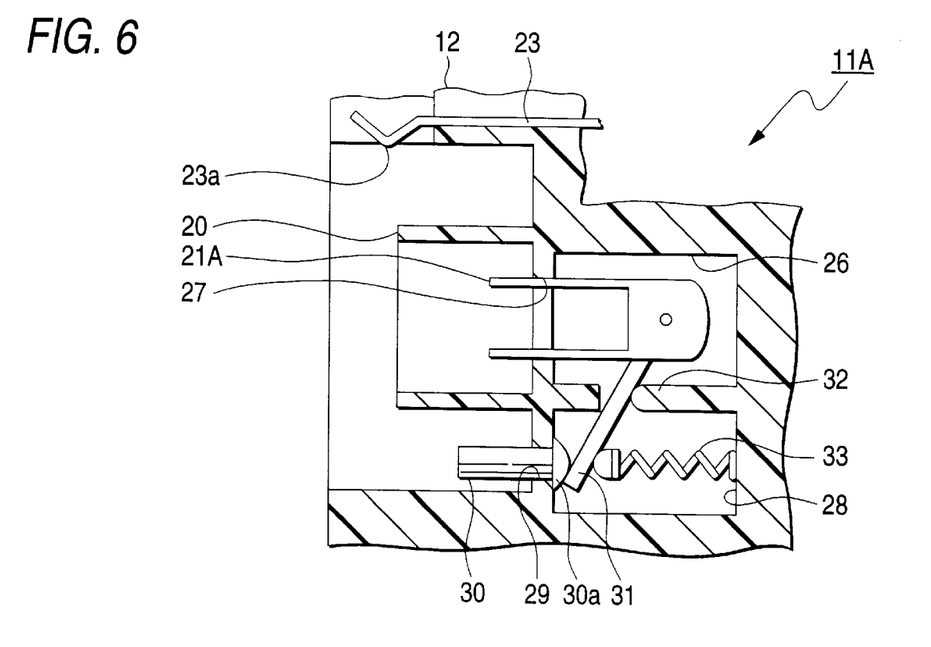
FIG. 6 shows a second embodiment of a socket for a discharge lamp bulb according to the present invention together with FIG. 7 and is an enlarged sectional view thereof.
Figure 7:
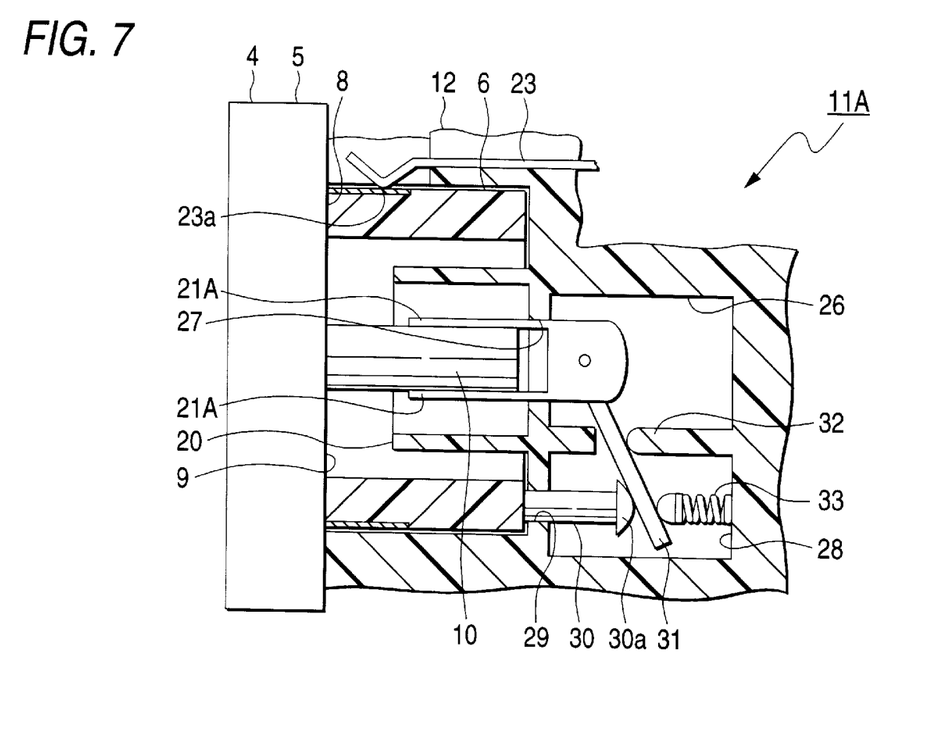
FIG. 7 is an enlarged sectional view showing the main part of the socket in a state attached to the discharge lamp bulb.

FIGS. 6 and 7 show a second embodiment of the socket for a discharge lamp bulb according to the present invention.

The difference of the second embodiment from the first embodiment described above resides in the insulating means only, and the remaining construction thereof is the same as that of the first embodiment. Therefore, only the difference will be explained in detail, and the remaining construction will be explained referring to the reference symbols in the first embodiment.

The first arrangement space is formed on the rear side of the cylindrical portion 20 of the socket 11A. The first arrangement space 26 is communicated with the internal space of the cylindrical portion 20 through-holes 27. High side power supply terminals 21A, 21A are passed through the through-holes 27 so that they are moved slidably in an axial, direction. That the high side power supply terminals 21A, 21A are coupled integrally at their rear ends.

At the rear side of the space outside the cylindrical portion 20, a second arrangement space 28 adjacent to the first arrangement space is formed. The second arrangement space 28 is communicated with the space outside the cylindrical portion 20 through a though-hole 29.

A pushed member 30 to be pushed is slidably passed through the through-hole 29. The member 30 has a cylindrical shape with a stopper edge 30a protruding sidewards from its read end. The stopper edge 30a has a larger diameter than that of the through-hole 29 so that it does not further protrude from the state where the stopper edge 30a abuts on the rear opening edge of the through-hole 29.

The intermediate section of a swinging member 31 is swingably supported in an axial direction in a wall 32 between the first and second arrangement spaces 26 and 28. By the end located in the first arrangement space 26 of the swinging member 31, i.e., the inner end thereof, the rear end of the high side power supply terminals 21A, 21A are rotatably supported while the end located in the second arrangement space 28, i.e., outer end abuts on the member 30 to be pushed.

A coil spring 33 intervenes between the rear end of the second arrangement space 28 and the outer end of the swinging member 31 in a contact state. Thus, the swinging member is urged by rotating force in a direction of moving the outer end thereof forward. Therefore, where the member 30 is not pushed from front, it protrudes forward to the position where the stopper edge 30a abuts on the rear opening edge of the through-hole 29. The tips of the high side power supply terminals 21A, 21A are also retracted to the vicinity of the bottom of the cylindrical portion 20. In this state, the high side power supply terminals 21A, 21A are separated from the low side power supply terminals 23, 23, 23 by the cylindrical portion 20. For this reason, when an operating voltage is applied to these two kinds of power supply terminals 21A, 21A and 23, 23, 23, discharging does not occur between these power supply terminals.

Where the socket 11A is attached to the discharge lamp bulb 1 as described above, when the coupling portion 12 of the socket 11 is fit over the base 4 of the discharge lamp bulb 1, the member 30 is pushed backward by the rear end of the small diameter portion 6 of the base 4. Therefore, the member 30 is moved backward against the moving force of the spring 33 so that the outer terminal of the swing member 31 is moved rearward. On the contrary, the inner end of the swinging member 31 is moved forward so that the high side power supply terminals 21A, 21A to reach the position shown in FIG. 7. Then, the high side power supply terminals 21A, 21A of the socket 11 are fit over the high side terminal 10 of the discharge lamp bulb 1. The contact sections 23a, 23a, 23a of the low side power supply terminals 23, 23, 23 are brought into elastic contact with the low side terminal 8 of the discharge lamp bulb 1. Thereafter, the socket 11 is rotated to be secured to the above securing position as described above.

Where the socket 11 does not still reach the securing position because of its insufficient rotation, i.e, does not secured at the normal connecting position, the elastic force of the spring 33 serves to push the rear end of the small diameter portion 6 of the discharging bulb 1 relatively forward through the outer end of the swinging member 31 and the member 30 thereby to push out the discharge lamp bulb 1 from the socket 1A. Thus, the socket 11 is removed from the discharge lamp bulb 1. As a result, as described above, the high side power supply terminals are retracted to shield the space between the high side power supply terminals 21, 21 and the low side power supply terminals 23, 23, 23.

Figure 8:
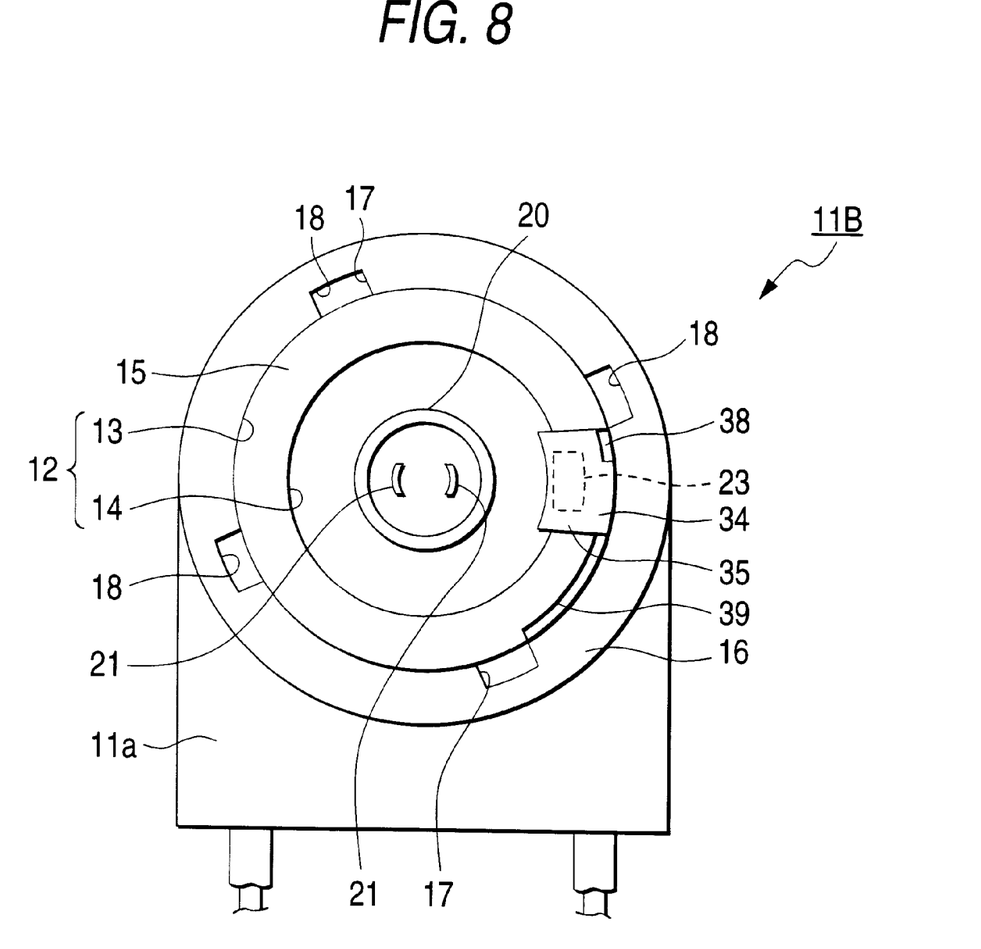
FIG. 8 shows a third embodiment of a socket for a discharge lamp bulb according to the present invention together with FIGS. 9 and 10 and is an enlarged front view of the socket for the discharge lamp bulb when an insulating wall is located at an insulating position.
Figure 9:
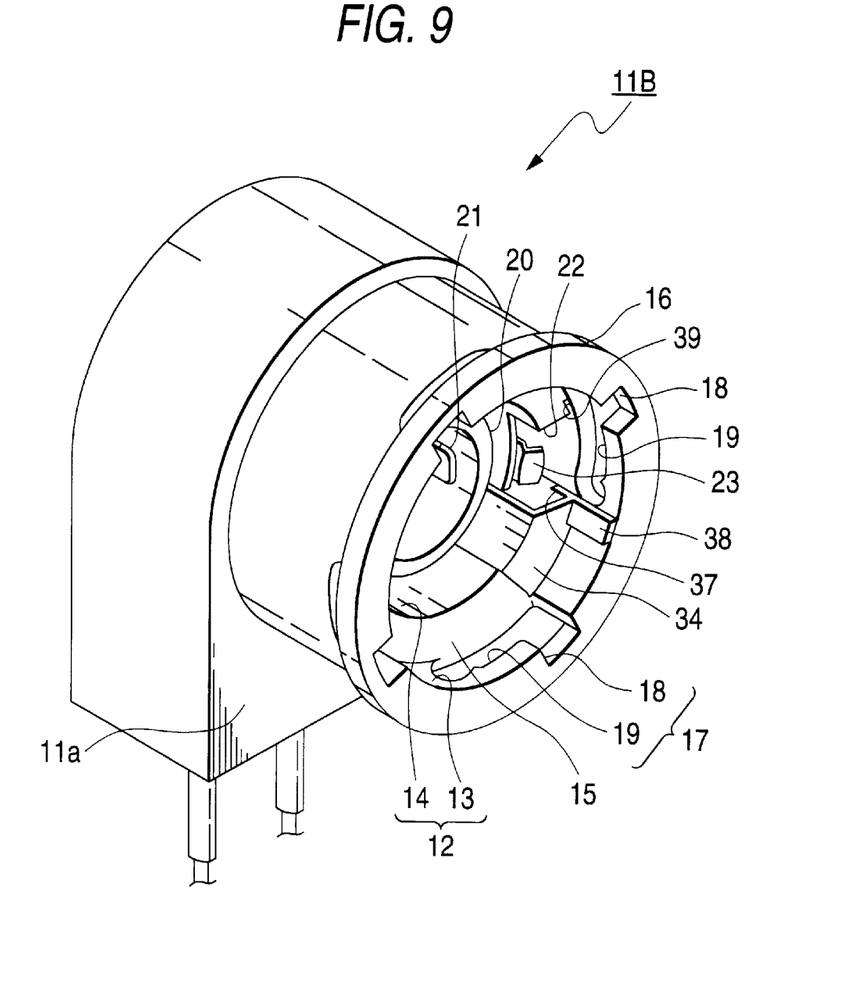
FIG. 9 is an enlarged perspective view of the socket for the discharge lamp bulb when the insulating wall is located at an opening position.
Figure 10:
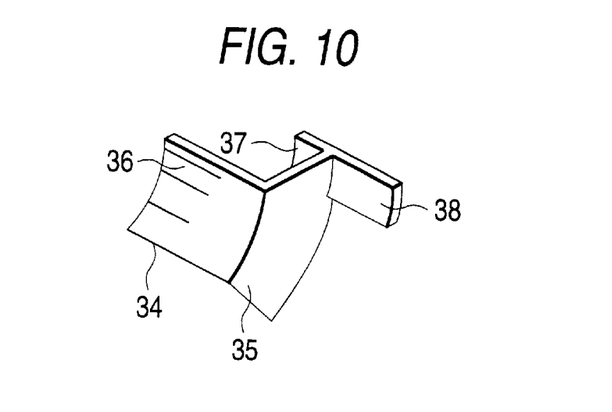
FIG. 10 is an enlarged perspective view of the insulating wall.

FIGS. 8 to 10 show a third embodiment of the socket for a discharge lamp bulb according to the present invention.

The difference of the third embodiment from the first embodiment described above resides in the insulating means only, and the remaining construction thereof is the same as that of the first embodiment. Therefore, only the difference will be explained in detail, and the remaining construction will be explained referring to the reference symbols in the first embodiment.

A socket 11B is provided with a sliding member 34 which is movable in a rotating direction in attachment/removal for the discharge lamp bulb 1. The sliding member 34 is made of an electrically insulating material, e.g. synthetic resin. The sliding member 34 includes a front portion 35, an insulating wall 36 and a guide piece 37. The front portion 35 has an arc shape when viewed from front and located to overlap the front surface of the step 15. The insulating wall 36 protrudes rearward from the inner edge of the front portion and is located along the inner periphery of the connecting portion 14. The guide piece 37 protrudes rearward from the outer edge of the front portion 35 at a small protruding degree. The sliding member 34 is also provided with a pushing piece 38 protruding forward from the outer edge of the front member 35.

At the outer edge of the step 15, i.e. the segment sandwiching the recess 22 of the portion along the inner periphery of the securing 13, guiding grooves 39, 39 are formed.

Thus, since the guide piece 37 of the sliding member 34 is engaged with the guiding grooves 39, 39, the front member 35 is arranged so that it can slide along the front surface of the step 15, and the insulating wall 36 is arranged so that can slide along the inner periphery of the connecting member 14. The sliding member 34 slides in a range between an insulating position where the insulating wall 36 overlaps the recess 22, i.e., the low side power supply terminal 23 overlaps the high side power supply terminals 21, 21 as shown in FIG. 8 and the position where the recess 22 is opened as shown in FIG. 9. When the sliding member 34 is in an insulating position, the pushing piece 38 is located at the end on the side of the introducing portion 18 of the engagement portion 19 of the engagement groove 17. The sliding member 34 is urged by a spring (not shown) to move toward the insulating position. Therefore, with external force not applied to the sliding member 34, the sliding member 34 is held at the insulating position.

With the sliding member 34 held at the insulating position, since the low side power supply terminal 23 is completely shielded by the insulating wall 36 and front portion 35, even when an operating voltage is applied to these two kinds of power supply terminals 21, 21 and 23, discharging will not occur between these power supply terminals.

Where the socket 11B is attached to the discharge lamp bulb 1 as described above, when the coupling portion 12 of the socket 11 is fit over the base 4 of the discharge lamp bulb 1, the high side power supply terminals 21, 21 are fit over the high side terminal 10 of the discharge lamp bulb 1. Thereafter, when the socket 11B is rotated toward the securing position, one of the engagement protrusions 7 of the discharge lamp bulb 1 pushes the pushing piece 38 of the sliding member 34, thereby moving the sliding member 34 toward the opening position. When the socket 11B is completely secured to the discharge lamp bulb 1, the sliding member 34 reaches the opening position so that the low side power supply terminal 23 is brought into elastic contact with the low side terminal 8.

When the socket 11B is removed from the discharge lamp bulb 1, one of the engagement protrusions 7 of the discharge lamp bulb 1 which pushes the pushing piece 38 of the sliding member 34 moves relatively along the engagement portion 19 of the engagement groove 17 toward the introducing portion 18. Thus, the sliding member 34 is moved by the moving force urged by the spring not shown. When the engagement protrusion 7 reaches the introducing portion 18, the sliding member 34 reaches the insulating position.

Figure 11:
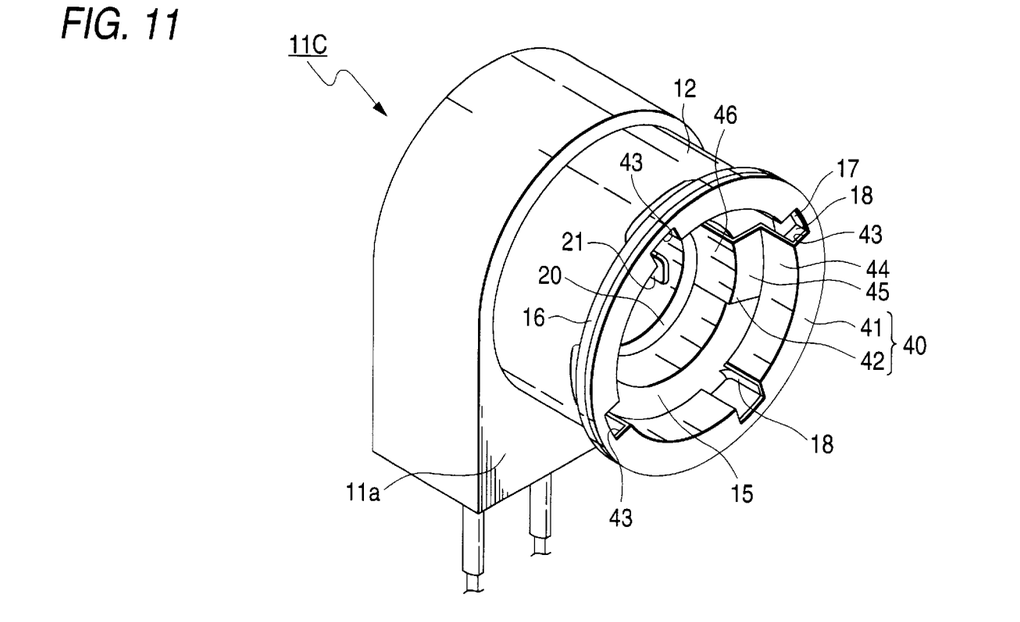
FIG. 11 shows a fourth embodiment of a socket for a discharge lamp bulb according to the present invention together with FIG. 12 and is an enlarged perspective view of the socket for the discharge lamp bulb when an insulating wall is located at an insulating position.
Figure 12:
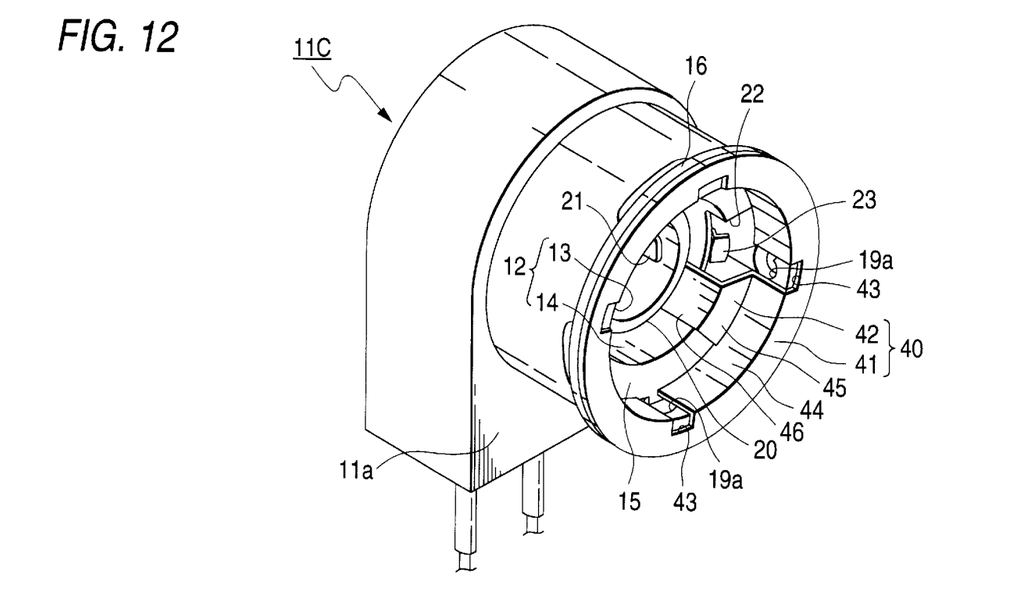
FIG. 12 is an enlarged perspective view of the socket for the discharge lamp bulb when the insulating wall is located at an opening position.

FIGS. 11 and 12 show a forth embodiment of the socket for a discharge lamp bulb according to the present invention.

The difference of the fourth embodiment from the first embodiment described above resides in the insulating means only, and the remaining construction thereof is the same as that of the first embodiment. Therefore, only the difference will be explained in detail, and the remaining construction will be explained referring to the reference symbols in the first embodiments A socket 11C is provided with a rotary ring 40.

The rotary ring 40 is made of an insulating material such as synthetic resin, and includes a ring portion 41 and an insulating wall 42 which are integrally formed.

The ring portion 41 is formed in a ring shape having substantially the same size as that of the flange 16. In a state stacked on the front surface of the flange 16 at the positions corresponding to the front end openings of the introducing portions 18, 18, . . . of the engagement grooves 17, 17, . . . , the ring portion 41 has recesses 43, 43, . . . with the same size as that of the front end openings.

From the inner edge of the ring portion 41 at the position in the vicinity of the recesses 43, 43, . . . , the insulating wall 42 is integrally protruded rearward. The insulating wall 42 integrally includes a coupling section 44 extending rearward from the inner edge of the ring portion 41, an intermediate section 45 protruding inward from the rear end of the coupling portion 44 and a covering section 46 protruding rearward from the inner end of the intermediate section 45.

With the ring portion 41 stacked on the front surface of the flange 16, the coupling section 44 of the insulating wall 42 stacked on the inner periphery of the securing section 13, the intermediate section thereof on the front surface of the step 15, and the covering section 46 thereof on the inner periphery of the connecting portion 14, the rotary ring 40 is rotatably supported on a socket body 11a. The rotary ring 40 is related to a spring not shown, and urged by rotating force directed to the insulating position. With no external force applied to the rotary ring 40, the one edge of the coupling section 44 of the insulating wall 42 is located along the edge of the introducing portion 18 of one of the engagement grooves 17, 17, . . . on the side of the engagement portion 19 and is held at the position where the intermediate section 45 of the insulating wall 42 covers the front side of the recess 22 and the covering section thereof covers the transverse side of the recess 22, i.e. insulating position.

With the rotary ring 40 held at the insulating position, since the low side power supply terminal 23 is completely shielded by the intermediate section 45 and covering section 46 of the insulating wall 42, even when an operating voltage is applied to the two kinds 21, 21 and 23, discharging will not occur.

Where the socket 11C is attached to the discharge lamp bulb 1 as described above, the engagement protrusions 7, 7 of the discharge lamp bulb 1 relatively enter the introducing portions 18, 18 of the engagement grooves 17, 17 through two recesses 43, 43 opposite to each other of the recesses 43, 43, . . . of the rotary ring 40. When the coupling portion 12 of the socket 11 is fit over the base 4 of the discharge lamp bulb 1, the high side power supply terminals 21, 21 are fit over the high side terminal 10 of the discharge lamp bulb 1. Therefore, when the engagement protrusions 7, 7 relatively move along the engagement portions 19, 19 of the engagement grooves 17, 17 toward the engagement parts 19a, 19a, one of them pushes one edge of the coupling section 44 of the insulating wall 42 of the rotary ring 40 so that the rotary ring 40 will move toward the opening position against the moving force by the spring (not shown).

When the socket 11C is secured to the discharge lamp bulb 1, i.e., reaches the normal connecting position, the rotary ring 40 reaches the opening position where the intermediate section 45 and covering section 46 of the rotary ring 40 do not reach the recess 22. The low side power supply 23 located in the recess 22 is brought into contact with the low side terminal 8 of the discharge lamp bulb 1.

Where the socket 11C is removed from the discharge lamp bulb 1, as the engagement protrusions 7, 7 of the discharge lamp bulb 1 relatively move along the engagement portions 19, 19 of the engagement grooves 17, 17 toward the introducing portions 18, 18, the rotary ring 40 is moved by the spring related thereto. When the engagement protrusions 7, 7 reach the innermost ends of the introducing sections 18, 18 of the engagement grooves 17, 17, the rotary ring 40 reaches the insulating position.

FIGS. 13 to 17 show a fifth embodiment of the socket for a discharge lamp bulb according to the present invention.

Figure 13:
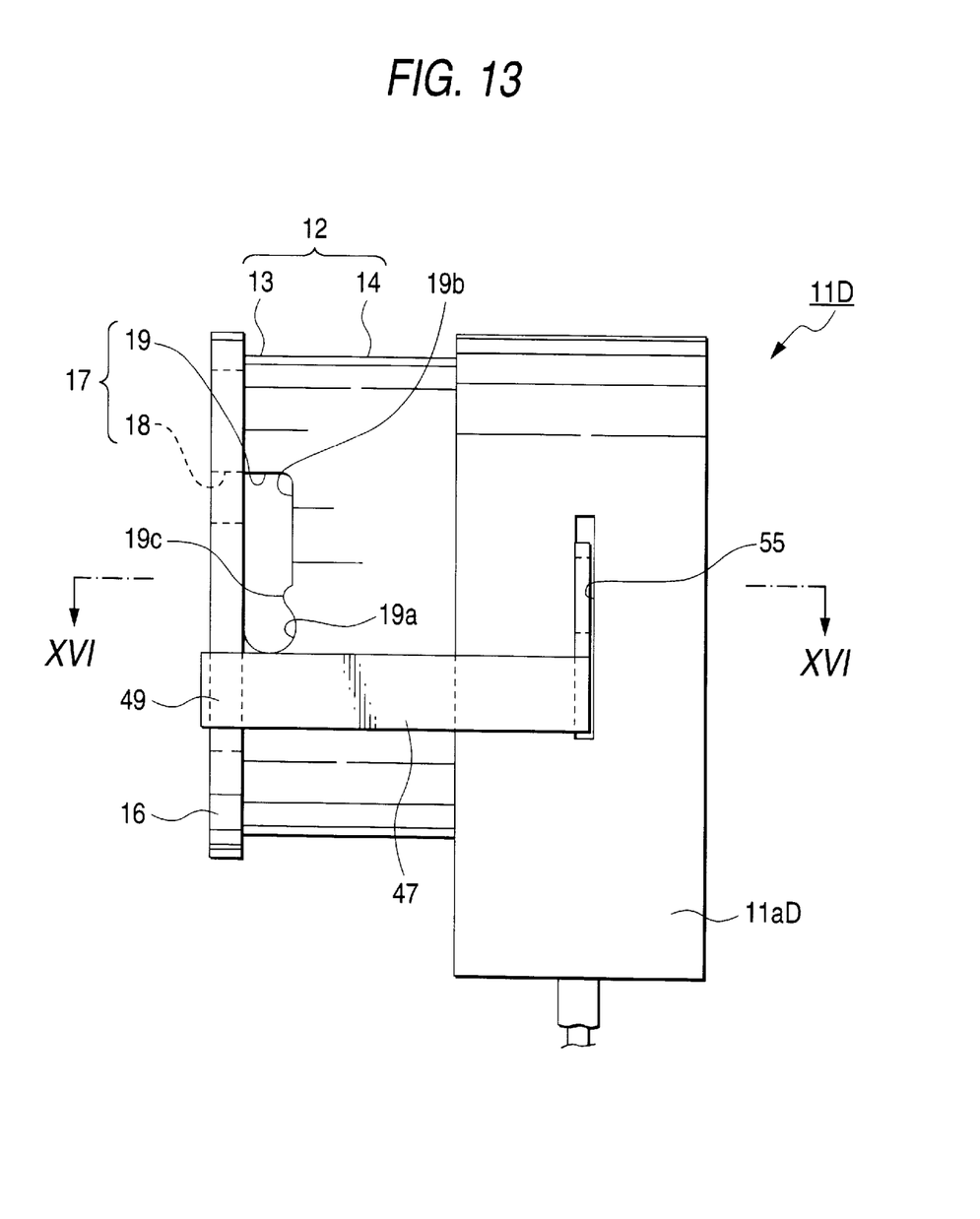
FIG. 13 shows a fifth embodiment of a socket for a discharge lamp bulb according to the present invention together with FIGS. 14 to 17 and is an enlarged perspective view of the socket for the discharge lamp bulb when a locking member is located at an insulating position.
Figure 14:
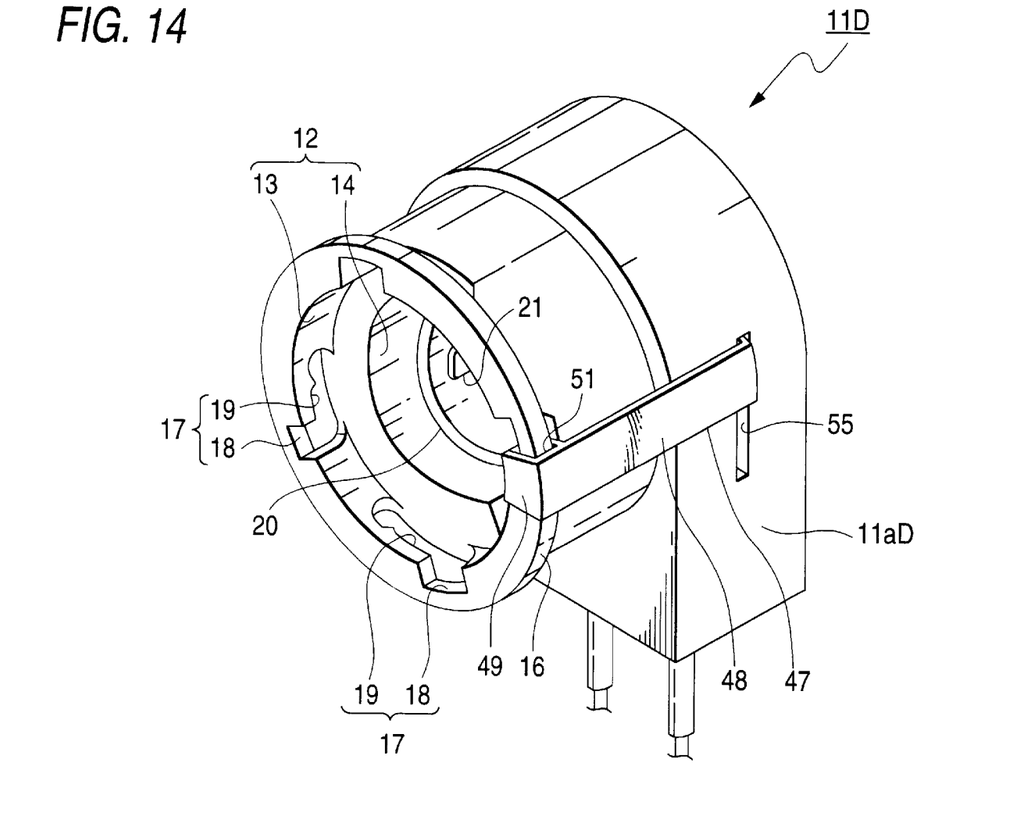
FIG. 14 is an enlarged perspective view when the locking member is located at an opening position.

The difference of the fourth embodiment from the first embodiment described above resides in that a socket body 11aD of a socket 11D is provided with a sliding member 47 which is freely movable. The remaining construction thereof is the same as that of the first embodiment. Therefore, only the difference will be explained in detail, and the remaining construction will be explained referring to the reference symbols in the first embodiment.

Figure 15:
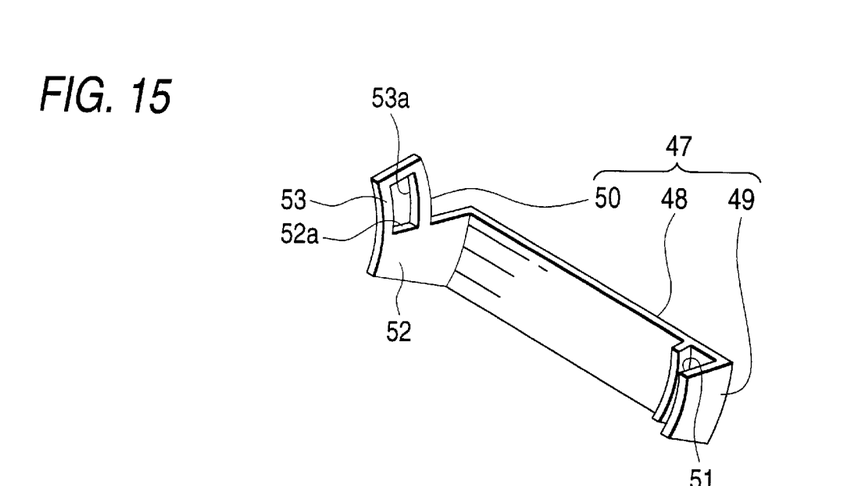
FIG. 15 is an enlarged perspective view of the locking member.

The sliding member 47 is made of an electrically insulating material such as synthetic resin, and integrally includes a main section 48 formed in a plate shape, a guiding section 49 communicating with the front end of the main section 48 and a separating plate 50 protruding inward from the rear end of the main section 48. The main section 48 is bent so as to be concave inward. The inner face is bent with the bending degree equal to that of the outer periphery of the socket body 11aD. The guiding section 49 has a guiding groove 51 formed on its inner surface.

The separating plate 50 has an arc shape when viewed from the front. The approximate half at the one end thereof serves as a separating portion 52, and the remaining portion serves as a communicating portion 53. The one end 52a of the separating portion 52 is formed in an edge shape having a thickness becoming small toward the tip.

Figure 16:
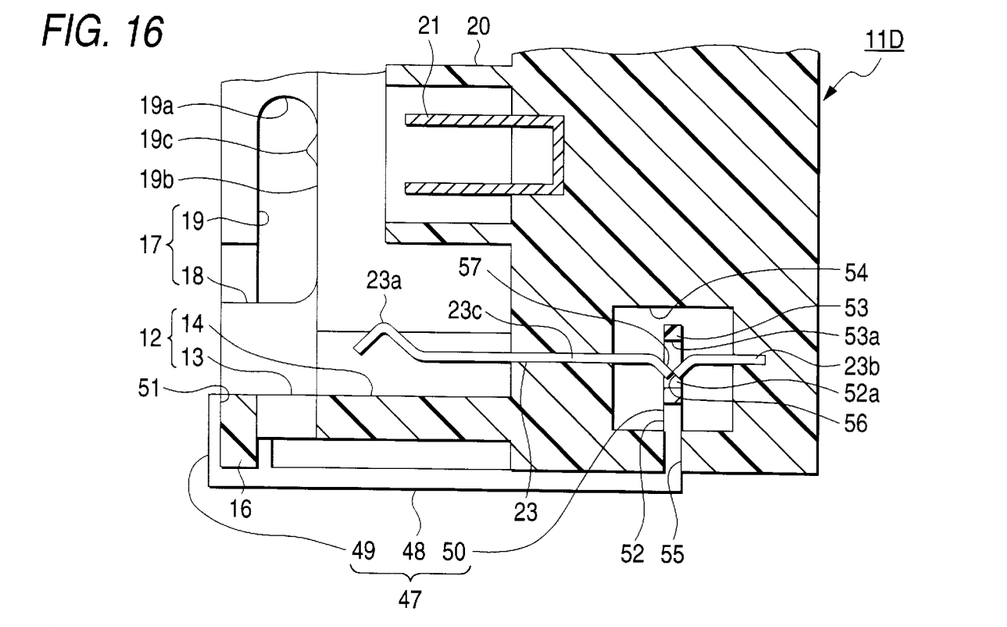
FIG. 16 is an enlarged sectional view taken in line XVI—XVI in FIG. 13.

Behind the portion of the socket body 11aD where the recess 22 is formed, an internal operating space 54 is formed. On the outer wall of the portion where the internal operating space 54 is formed an introducing hole 55 is formed thus communicating the internal operating space with the outside.

Figure 17:
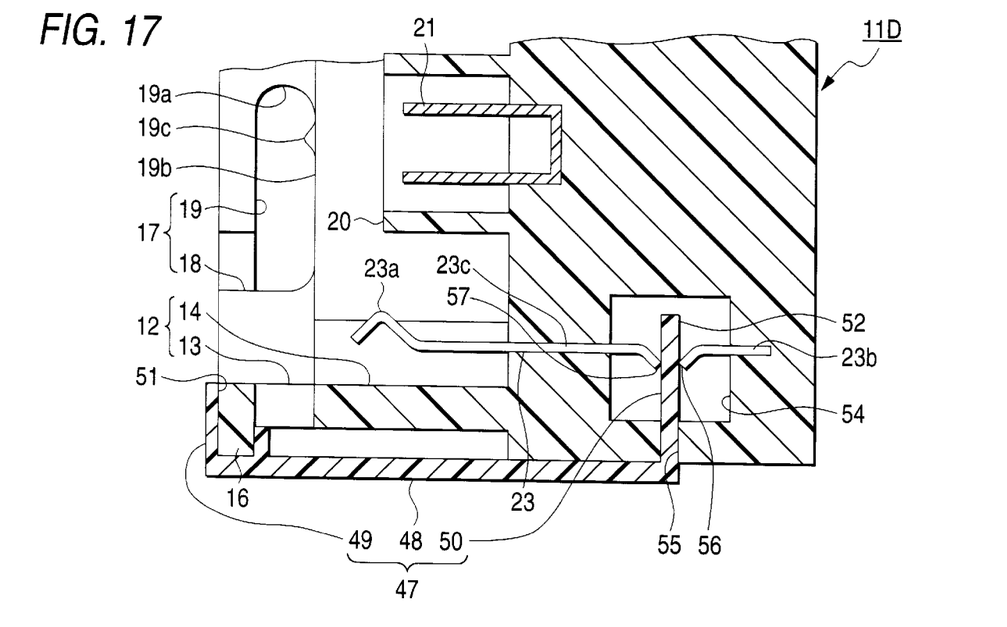
FIG. 17 is an enlarged sectional view when the state where the locking member is located at the opening position is cut at the same line as in FIG. 16.

The low side power supply terminals 23, 23, 23 are separated within the internal operating space 54 into socket-side segments 23b, 23b, 23b and bulb-side segments 23c, 23c, 23c. The ends of the respective segments on the side of a partner constitute elastic contact portions 56, 56, 56 and 57, 57, 57. With no component intervening between these segments, they are individually formed in an elastic contact manner.

Thus, the locking portion is supported by the socket body 11aD so as to be movable between the opening position and securing position in a state where with the main section 48 of the sliding member 47 located along the outer periphery of the socket body 11aD, the flange 16 of the socket body 11aD is slidably engaged in the guiding groove 51 of the guiding portion 49 and the separating plate 52 is inserted in the internal operating space of from the introducing hole 55. Namely, the position shown in FIG. 14 is the opening position whereas the position shown in FIG. 13 is the securing position. With the sliding member 47 located at the opening position, the separating segment 52 of the separating plate 52 is located between the elastic contact portions 56, 56, 56 of the socket side segments 23b, 23b, 23b of the low side power supply terminals 23, 23, 23 and those 57, 57, 57 of the bulb side segments 23c, 23c, 23c thereof. In this state, even when a starting voltage is outputted form a lighting circuit (not shown), it is not applied to the bulb side segments 23c, 23c, 23c of the low side power supply terminals 23, 23, 23. On the other hand, with the sliding member 47 located at the securing position, the portions of the low side power supply terminals 23, 23, 23 within the internal operating space 54 are located in the introducing hole 53a of the separating plate 52. Thus, the elastic contact portions 56, 56, 56 of the socket side segments 23b, 23b, 23b and those 57, 57, 57 of the bulb side segment 23c, 23c, 23c are brought into elastic contact with each other so that when the starting voltage is outputted from the starting circuit not shown, it is applied to the bulb side segments 23c, 23c, 23c.

Thus, with the sliding member 47 at the opening position, as described above, even when the starting voltage is outputted from the starting circuit not shown, it is applied to the bulb side segments 23c, 23c, 23c of the low side power supply terminals 23, 23, 23. For this reason, discharging does not occur between the low side power supply terminals 23, 23, 23 and the high side power supply terminals 21, 21.

With reference to FIG. 16, when the coupling portion 12 of the socket 11D is fit over the base 4 of the discharge lamp bulb 1, the high side power supply terminals 21, 21 of the socket 11D are fit over the high side terminal of the discharge lamp bulb 1, and the contact sections 23a, 23a, 23a are brought into contact with the discharge lamp bulb 1. In this state, however, the sliding member 47 remains at the opening position so that no voltage is applied to the low side terminal 8 of the discharge lamp bulb 1.

When the sliding member 47 moves to the securing position, the socket 11D is surely secured to the discharge lamp bulb 1. Further, as described above, the socket side segments 23b, 23b, 23b and the bulb side segment 23c, 23c, 23c of the low side power supply terminals are brought into elastic contact with each other, thus resulting in a state where the starting voltage can be applied to the discharge lamp bulb 1.

When the socket 11D is removed from the discharge lamp bulb 1, the sliding member 47 is moved to the opening position so that the separating portion 52 intervenes between the socket side segments 23b, 23b, 23b and the bulb side segment 23c, 23c, 23c of the low side power supply terminals 23, 23, 23.

As apparent from the description hitherto made, the socket for a discharge lamp bulb according to the present invention is a socket for a discharge lamp bulb having two kinds of power supply terminals which are connected to a starting circuit for turning on the discharge lamp bulb and attached to one end of the discharge lamp so that they are individually connected to two terminals of the discharge lamp bulb. The socket comprises a securing means for securing it to a normal connecting position relative to the discharge lamp bulb. The socket further comprises an insulating means for insulating the two kinds of power supply terminals from each other when the socket is not secured at the normal connecting position relative to the discharge lamp bulb.

Thus, the socket for a discharge lamp according to the present invention can insulate the space between the two kinds of power supply terminals from each other when the A socket is incompletely connected to the discharge lamp bulb. For this reason, discharging which damages the discharge lamp bulb and the socket therefor does not occur.

Incidentally, the concrete shape and structure of each member in each of the embodiments described above are only examples for embodying the present invention, and hence the technical scope of the present invention should not be limited by them.

What is claimed is:

1. A socket for a discharge lamp bulb having two terminals, comprising:

a housing having a hollow interior, and an opening through which said discharge lamp bulb is insertable into said hollow interior;

a first power supply terminal and a second power supply terminal provided in said hollow interior of said housing; and a shielding wall movably mounted to said housing, said shielding wall provided around said first power supply terminal such that said second power supply terminal remains located to an outside of said shielding wall;

wherein said shielding wall is moveable between (1) an extended position in which said shielding wall is positioned toward said opening of said housing to completely shield said first power supply terminal from said second power supply terminal, and (2) a retracted position in which said shielding wall is positioned away from said opening of said housing; and wherein said second power supply terminal remains located to said outside of said shielding wall in both the extended position and the retracted position.

2. The socket according to claim 1, wherein said shielding wall is made of a synthetic resin.

3. The socket according to claim 1, further comprising:

a spring positioned between said housing and said shielding wall that enables said shielding wall to move in an axial direction of said housing.

4. A socket for a discharge lamp bulb having two terminals, comprising:

a housing having a hollow interior, and an opening through which said discharge lamp bulb is insertable into said hollow interior;

a first power supply terminal and a second power supply terminal provided in said hollow interior of said housing; and a fixed shielding wall provided around said first power supply terminal such that said second power supply terminal is located to an outside of said shielding wall;

wherein said first power supply terminal is moveable between (1) a retracted position in which said first power supply terminal is positioned away from said opening of said housing, such that said fixed shielding wall completely shields said first power supply terminal from said second power supply terminal, and (2) an extended position in which said first power supply terminal is positioned toward said opening of said housing for electrically connecting to one of said two terminals of said discharge lamp bulb.

5. The socket according to claim 4, wherein said fixed shielding wall is made of a synthetic resin.

6. A socket for a discharge lamp bulb having two terminals, comprising:

a housing having a hollow interior, and an opening through which said discharge lamp bulb is insertable into said hollow interior;

a first power supply terminal and a second power supply terminal provided in said hollow interior of said housing, said first power supply terminal having a socket-side segment and a bulb-side segment which are both elastically deformable; and a sliding member mounted to said housing for movement between (1) a position in which said sliding member forces apart and interposes between said socket-side segment and said bulb-side segment of said first power supply terminal, and (2) a position in which said sliding member does not interpose between said socket-side segment and said bulb-side segment of said first power supply terminal.

7. The socket according to claim 6, wherein said sliding member is made of a synthetic resin.

* * * * *